I. PUTNAM.
INCUBATOR.
APPLICATION FILED JULY 12, 1909.

978,205. Patented Dec. 13, 1910.

WITNESSES:
M. E. Verbeck.
G. H. Thomas

INVENTOR
Israel Putnam
BY
Eugene Diven
ATTORNEY

UNITED STATES PATENT OFFICE.

ISRAEL PUTNAM, OF ELMIRA, NEW YORK.

INCUBATOR.

978,205.

Specification of Letters Patent. Patented Dec. 13, 1910.

Application filed July 12, 1909. Serial No. 507,049.

*To all whom it may concern:*

Be it known that I, ISRAEL PUTNAM, a citizen of the United States, residing at Elmira, in the county of Chemung and State of New York, have invented certain new and useful Improvements in Incubators, of which the following is a specification.

This invention relates to improvements in the heating and ventilating systems for incubators; and my objects are to provide a simple and effective means for heating the egg chamber to a uniform degree, and to provide a simple and effective means for the automatic removal of the carbonic acid gas and the admission of fresh air to the egg chamber.

I attain my objects by constructing the incubator in the manner illustrated in the accompanying drawings, in which—

Figure 1:
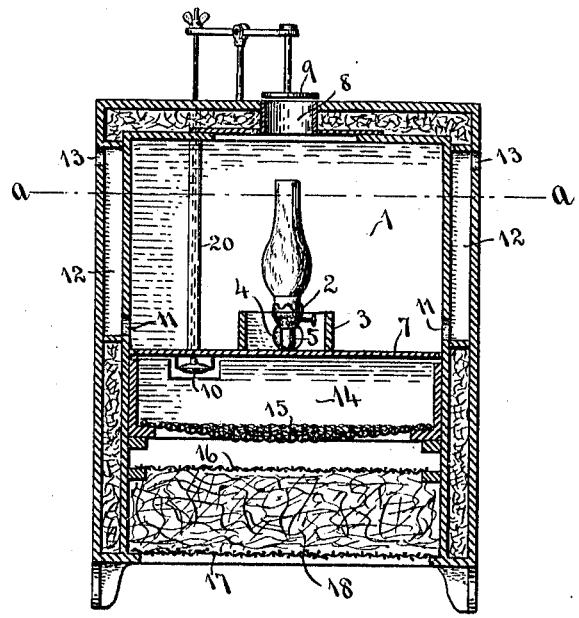
Figure 2:
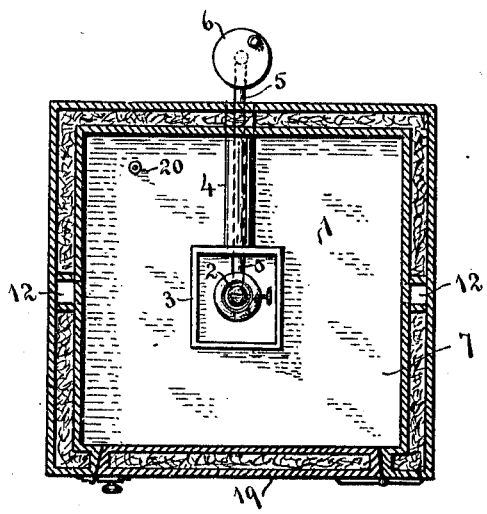

Figure 1 shows a vertical section through my improved incubator; and Fig. 2, a horizontal section on the line *a—a* in Fig. 1.

Like numerals designate like parts in the two views.

In carrying out my invention I provide a chamber 1 in the upper portion of the incubator, in which I place one or more lamp burners, according to the size of the incubator, said burners being so positioned as to equally distribute the heat to all parts of the chamber as nearly as possible. In the incubator as illustrated, I employ one burner 2, positioned centrally in the chamber 1, said chamber being made square in order that the heat may be equally distributed from the opposite sides of the burner around the chamber. Surrounding the lower portion of the burner is a wall 3, which incloses a chamber into which fresh air is admitted, to feed the burner, by way of a pipe 4, which extends from one side of the wall to and through one of the side walls of the incubator. The lamp burner is fed by way of a small pipe 5, which passes through the air pipe 4 from an oil reservoir 6, positioned at the outside of the incubator. The wall 3 rests upon a sheet metal diaphragm 7, which forms the floor of the lamp compartment. Above the lamp is a vent 8, which is held normally closed by a cap 9, controlled by a thermostat 10 in the egg compartment, in the usual manner.

At opposite sides of the chamber 1, just above the diaphragm 7, there are ports 11, which lead to air ducts 12, provided between the inner and outer walls of the incubator, said ducts communicating at their upper ends with the atmosphere through the ports 13. Thus, when the cap 9 is closed, the heated air and gases of combustion from the lamp will fill the chamber 1, being carried down to the bottom of the chamber by reason of the downdraft established through the ports 11 and the ducts 12. The heat generated in the chamber is transmitted to the metal diaphragm 7, and thence transmitted to the egg compartment below. When the heat in said compartment becomes great enough to affect the thermostat, the cap 9 will be raised to permit a direct escape of the heated air from the upper portion of the chamber 1, thereby cooling the chamber and preventing the further transmission of excess heat through the diaphragm.

Below the diaphragm is positioned the egg compartment, into which is inserted an egg drawer 14, the bottom of which drawer consists of wire cloth 15, or other suitable porous material, which is slightly depressed at the center beneath the burner, where the heat is strongest. Within this drawer and upon the porous bottom the eggs will be placed.

Below the egg drawer are two diaphragms 16 and 17 of cheesecloth or burlaps, stretched across between the side walls of the incubator, and spaced apart a suitable distance to receive between them a filling 18 of straw, or other suitable material, which will act as a nonconductor of heat, and yet provide interstitial spaces or porosity for the passage therethrough of the carbonic acid gas given off from the eggs in the egg compartment, the heavy gas descending through the filling, and fresh air passing upward therethrough to take the place of the gas. This ventilation takes place automatically and needs no attention or regulation; the incubator being otherwise closed to the admission of air.

The incubator is constructed in the usual manner with double walls, between which is a filling of mineral wool or other suitable nonconducting material. The lamp is reached for trimming and other attention through a door 19, provided at one side of the incubator, as shown in Fig. 2, and the drawer 14 is arranged to pull out from the same side. Through the chamber I provide, at 20, a tubular passageway for the vertical rod which passes upward from the thermostat 10; so that said rod will not be affected by the heat in the chamber 1; and the back of the drawer 14 will be notched to permit it to pass the thermostat.

Having thus described the several parts which go to make up my improved incubator, and without confining myself to any of the specific details of construction, as shown, what I claim as my invention and desire to secure by Letters Patent is—

1. An incubator comprising an egg compartment, a heating chamber above said compartment, a nonporous heat conducting diaphragm between the two, means for supplying heat to the chamber, means for producing a downward circulation of air in the chamber, a porous diaphragm in the egg compartment upon which to rest the eggs, and a bottom closure for the incubator composed of two porous diaphragms spaced apart with a porous filling of nonheat conducting material between.

2. An incubator comprising an egg compartment, a chamber above said compartment, a nonporous heat conducting diaphragm between the two, a burner in the chamber, means for supplying both air and fuel to said burner from outside the chamber, means for producing a downward circulation of air in the chamber, a porous diaphragm in the egg compartment upon which to rest the eggs, and a bottom closure for the incubator composed of porous nonheat-conducting material.

3. An incubator comprising an egg compartment, a chamber above said compartment, a nonporous heat conducting diaphragm between the two, a burner at the center of the chamber, a wall inclosing an air space around the burner, an air conduit leading to said space from outside the incubator, means for feeding fuel to the burner from outside the chamber, and means for producing a downward circulation of air in the chamber, whereby the heat of the chamber is imparted to the diaphragm immediately beyond and around said wall.

In testimony whereof I have affixed my signature, in presence of two witnesses.

ISRAEL PUTNAM.

Witnesses:
M. E. VERBECK,
EUGENE DIVEN.